No. 801,551. PATENTED OCT. 10, 1905.
H. F. SHADBOLT.
MACHINE FOR THE MANUFACTURE OF EXCELSIOR WRAPPERS AND PADS.
APPLICATION FILED DEC. 17, 1904.
10 SHEETS—SHEET 5.

Fig. 5.

No. 801,551. PATENTED OCT. 10, 1905.
H. F. SHADBOLT.
MACHINE FOR THE MANUFACTURE OF EXCELSIOR WRAPPERS AND PADS.
APPLICATION FILED DEC. 17, 1904.
10 SHEETS—SHEET 6.

No. 801,551. PATENTED OCT. 10, 1905.
H. F. SHADBOLT.
MACHINE FOR THE MANUFACTURE OF EXCELSIOR WRAPPERS AND PADS.
APPLICATION FILED DEC. 17, 1904.
10 SHEETS—SHEET 7.

No. 801,551. PATENTED OCT. 10, 1905.
H. F. SHADBOLT.
MACHINE FOR THE MANUFACTURE OF EXCELSIOR WRAPPERS AND PADS.
APPLICATION FILED DEC. 17, 1904.

No. 801,551. PATENTED OCT. 10, 1905.
H. F. SHADBOLT.
MACHINE FOR THE MANUFACTURE OF EXCELSIOR WRAPPERS AND PADS.
APPLICATION FILED DEC. 17, 1904.
10 SHEETS—SHEET 10.

Fig. 15.

UNITED STATES PATENT OFFICE.

HELON F. SHADBOLT, OF SHEBOYGAN, WISCONSIN, ASSIGNOR TO EXCELSIOR WRAPPER COMPANY, OF SHEBOYGAN, WISCONSIN.

MACHINE FOR THE MANUFACTURE OF EXCELSIOR WRAPPERS AND PADS.

No. 801,551.      Specification of Letters Patent.      Patented Oct. 10, 1905.

Application filed December 17, 1904. Serial No. 237,334.

*To all whom it may concern:*

Be it known that I, HELON F. SHADBOLT, a citizen of the United States, and a resident of Sheboygan, in the county of Sheboygan and State of Wisconsin, have invented certain new and useful Improvements in Machines for the Manufacture of Excelsior Wrappers and Pads; and I do hereby declare that the following is a full, clear, and exact description thereof.

My invention relates to the manufacture of excelsior wrappers and pads and the like; and it consists in the peculiarities of construction and combination of parts of certain mechanism for accomplishing this purpose, being in part an improvement on the devices set forth in my prior Letters Patent, No. 570,236, granted to my assignee, the Excelsior Wrapper Company, on October 27, 1896, the present improvements relating especially to the mechanism at the discharge end of the machine, where the completed wrapper or pad is cut into sections of the desired length, and to the cutting mechanism and associated parts, all as will be more fully set forth hereinafter in connection with the accompanying drawings and subsequently claimed.

In the said drawings, Fig. 10 is a perspective view of the lower portion, and Fig. 11 is a like view of the upper portion, of the carrier-frame.

Referring by numerals to the said drawings, 1 2 designate the main longitudinal sills of the machine.

3 4 5 are uprights rising from the sill 1, and 6 7 8 uprights rising from the other sill 2. Uprights 3 4 are connected by longitudinal brace 9 and uprights 6 7 by like brace 10. Transverse beams 11 12 13 connect the main sills 1 2, there being short longitudinal timbers 14 15 between the beams 11 12. On each side of the machine is an upper longitudinal timber, these being marked 16 and 17, respectively.

18 designates a tie-beam connecting the uprights 4 and 7.

The uprights 3 4 5 are provided with upper boxes 19 20 21 for the drive-shaft 22 and below these with boxes 23 24 25 for shaft 26 and below these with boxes 27 28 29 for shaft 30.

31 is a box on the sill 1, in which is supported the lower end of a vertical shaft 32, (kept up by a collar 33 on said shaft above said box 31,) the upper end of this shaft turning in a box 34 on a block 35, secured to the longitudinal upper timber 16, while below and against this block there comes the hub of a miter-gear 36, fast to the shaft 32 and in mesh with a like gear 37 fast on the adjacent end of the shaft 26, the hub of said gear coming up to the box 23 on the upright 3. Near its lower end shaft 32 has fast thereto another miter-gear 38, which meshes with a like gear 39, whose hub is fast on a transverse shaft 40, mounted in boxes 41 42 on the short longitudinal timbers 14 15, the sill 1 being recessed, as shown at 43, to afford room for said gear 39 and the shaft 40, carrying fast on its inner end the crank-disk 44, which has a crank-pin 45 for operating the cutting mechanism, as hereinafter described. At the upper ends of the uprights 3 and 6 are forward-projecting blocks 46 47, and these blocks have boxes 48 49 upon their outer ends, which support a rock-shaft 50, extending between these transversely of the machine.

51 52 designate hangers whose upper ends are fast to said rock-shaft and which carry inwardly-projecting pins 53 54 adjacent to their lower ends, which pins take into recesses on the side pieces 55 56 of the oscillating sash-frame. The sash-frame side pieces are united at the top by cross-bar 57 and at the bottom by two cross-bars 58 58. The inner opposing edges of said side pieces 55 56 are formed with central vertical grooves 59 for the reception of vertical tongues 60 on the outer edges of the side pieces 61 62 of the sash. This sash has its side pieces united at top by a cross-piece 63 and carries the oblique-disposed knife-blade 64, and below the said side pieces are further united by cross-pieces 65 66. The sash-frame carries the stationary straight knife-blade 67 on the inner side and beyond this a cross-beam 68, from which there extends a downward-curved guide 69, while on the opposite or outer side and practically in line with the knife 67 is a strip 70, whose ends are bent to form loops for the guidance of the side pieces of the sash. The side pieces 55 56 of the sash-frame have grooves 71 in the portions of their outer edges, in which are located sliding blocks 73 74, connected to levers in this manner.

Figure 3:
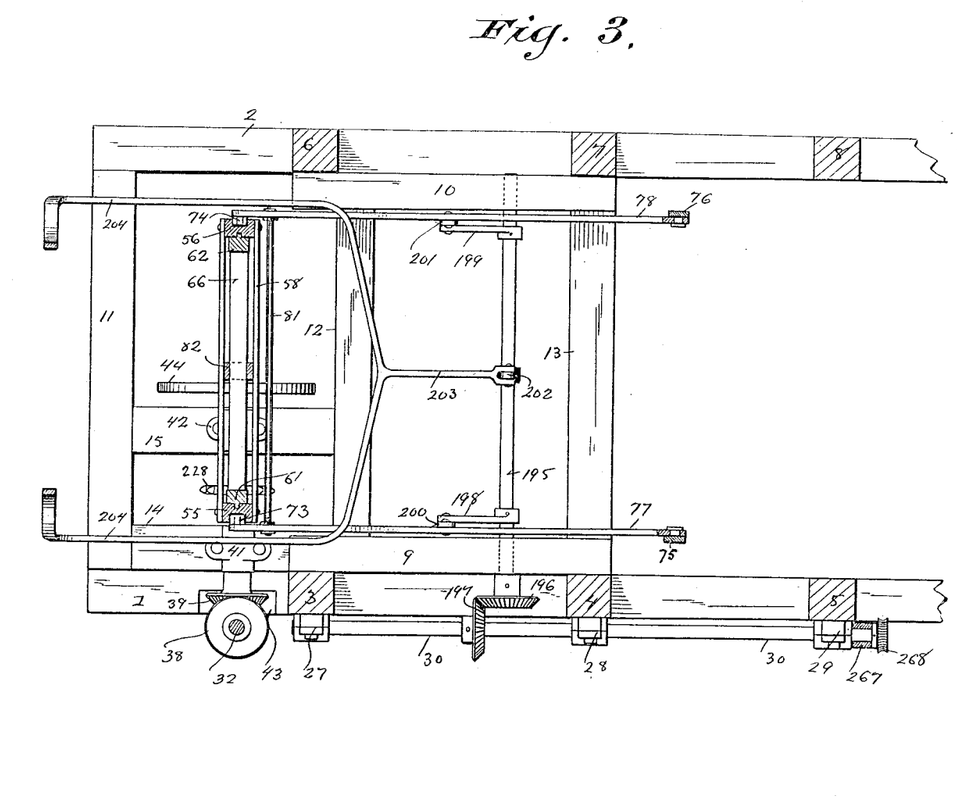
Figs. 3 and 4 are plan views, partly in horizontal section, taken on the planes indicated by lines 3 3 and 4 4, respectively, in Fig. 2.
Figure 4:
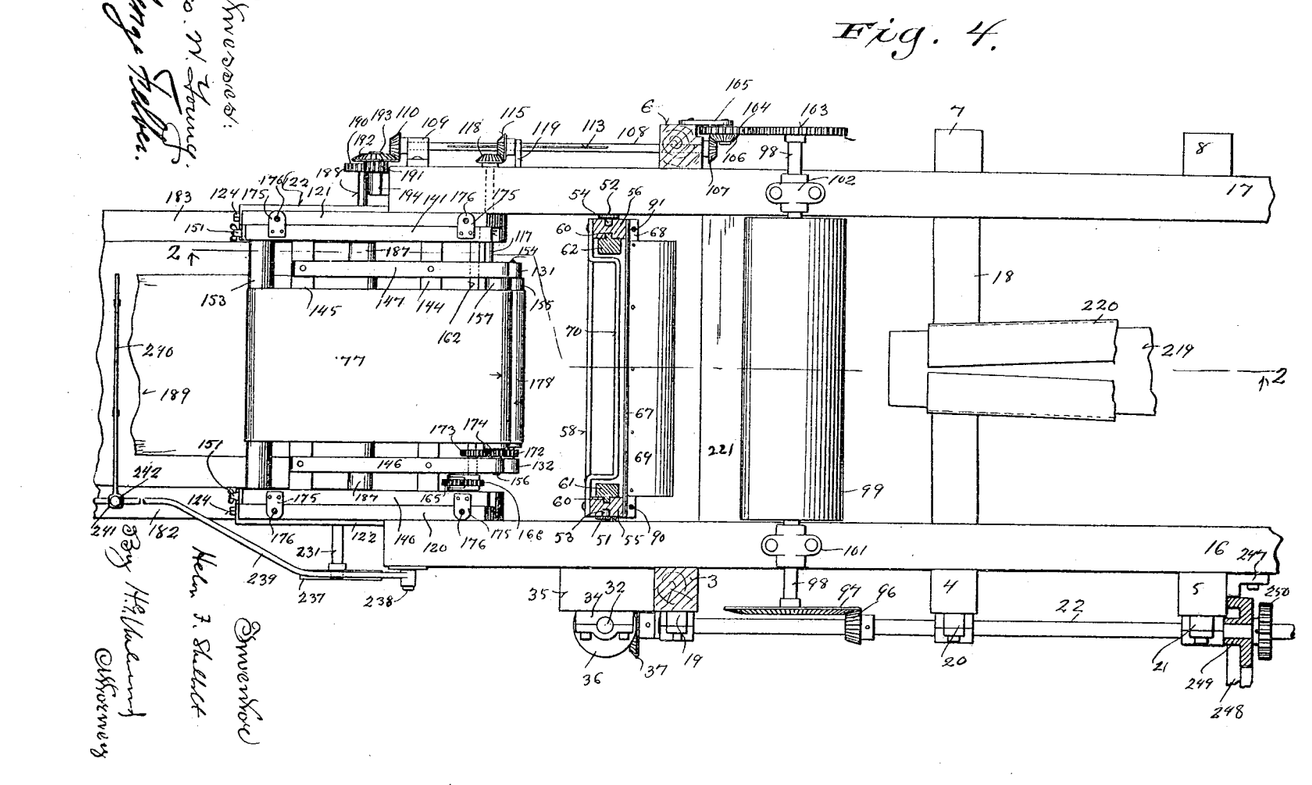
Figure 5:
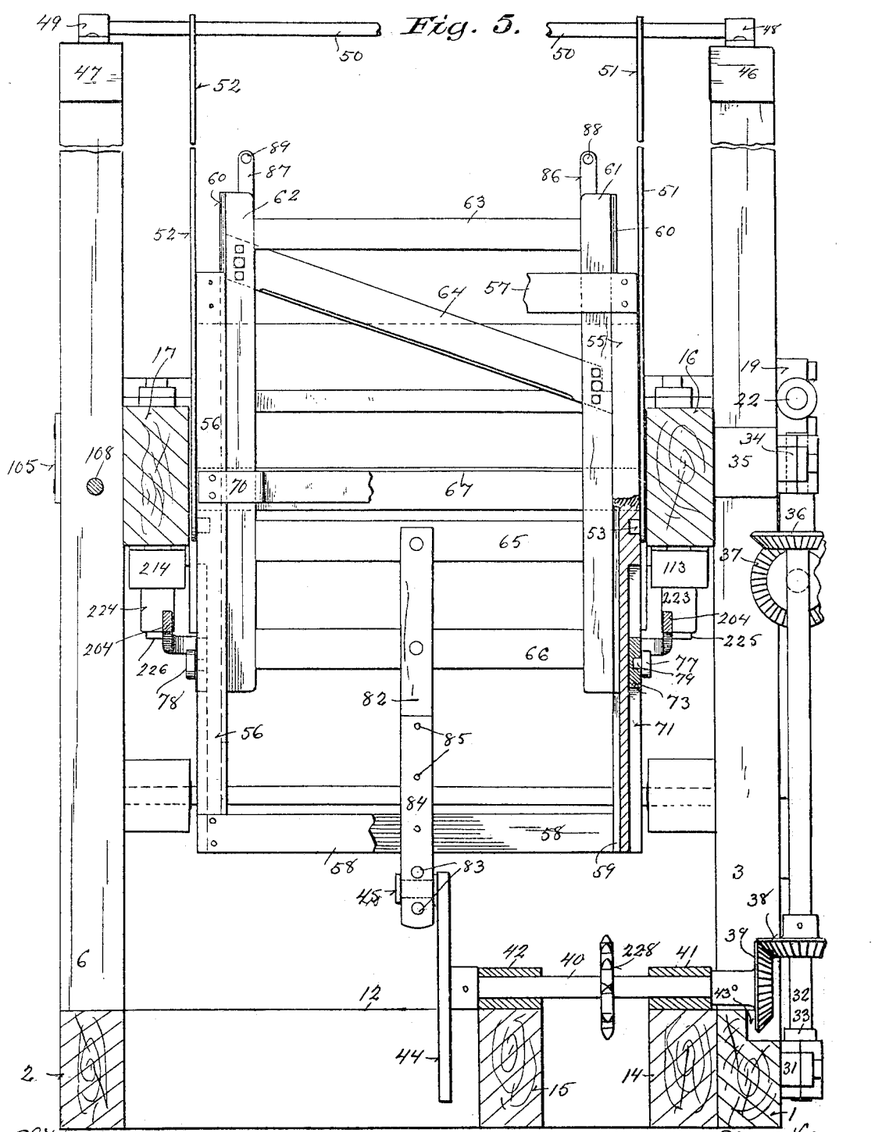
Fig. 5 is an end elevation, partly in section, on the line 5 5 in Fig. 2, of the cutting mechanism near the discharge end of the machine.
Figures 6, 7:
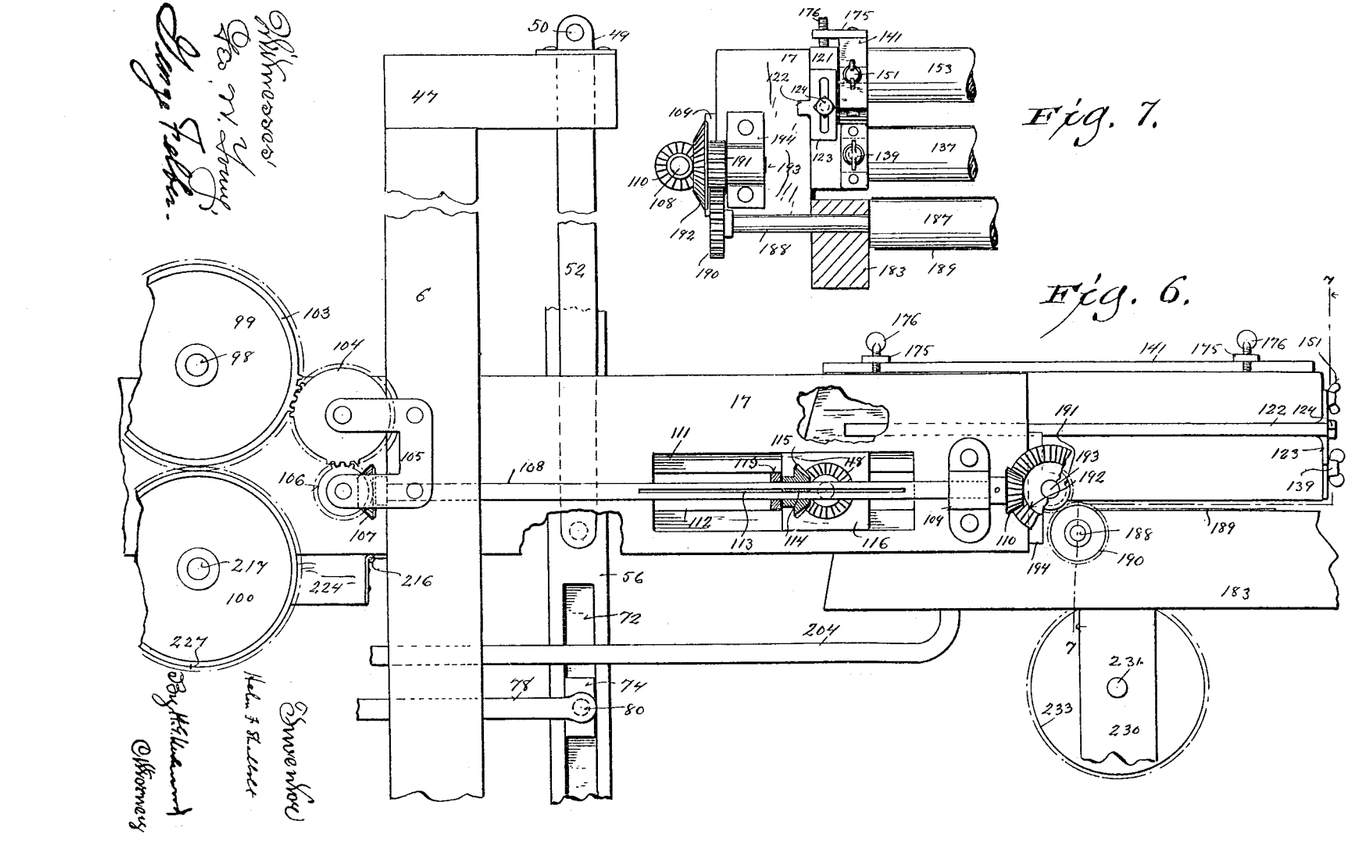
Fig. 6 is a view in side elevation of the opposite side of the machine to that shown in Fig. 1.
Fig. 7 is a detail transverse sectional view taken on the plane indicated by the line 7 7 in Fig. 6.

75 76 designate arms rigidly secured to and depending from the longitudinal upper timbers 16 17, and to the lower ends of these arms there are pivotally secured the adjacent ends of longitudinally-arranged bent levers 77 78, whose other ends have inwardly-projecting lateral pins 79 80, which fit in recesses in the hereinbefore-named sliding blocks 73 74. These levers 77 78 are united by a tie-rod 81, which has threaded ends passing through smooth bores in said levers adjacent to the pin-bearing ends thereof and secured in place by nuts, as best shown in Fig. 3.

82 represents a connecting-rod, preferably formed of a stick of timber forked at its upper end, so as to straddle the cross-pieces 65 66 of the sash, and split at its lower end, with an intersecting bore, whereby said lower end may be sprung over the crank-pin 45 and secured by bolts 83 83. If desired, this connecting-rod 82 may be protected by a thin metal facing 84, secured to the wood of the rod by flush-headed rivets 85, as shown.

Rising from the side pieces 55 56 of the sash are the arms 86 87, connected by eyebolts 88 89 to guide-rods 90 91, which extend loosely and vertically through the presser-bar 92 and cross-beam 68. Said presser-bar has lugs 93 therein, which engage with brackets 94 upon the said sash side bars 55 56, and the guide ends are surrounded by spiral springs 95 above the presser-bar.

The main drive-shaft 22 has fast thereon a pinion 96 in mesh with a gear-wheel 97, which is fast on the adjacent end of the journal 98 of the upper feed-roller 99, the lower feed-roller 100 being supported below the same, as hereinafter described. The journal 98 is supported in boxes 101 102 above the upper longitudinal timbers 16 17. On the opposite end of journal 98 the same has fast thereto the gear 103, which meshes with a pinion 104 on the upper arm of a bracket 105, which is bolted to and projects from the upright 6. The pinion 104 is in mesh with the spur-teeth of a smaller compound pinion 106 on the lower arm of said bracket 105, this pinion 106 having also miter-teeth for engagement with the miter-gear 107 on the end of a longitudinally-arranged shaft 108. This shaft extends at one end through a horizontal bore in upright 6, and the other end is supported in a box 109, which is bolted to the outer side of the timber 17, the said shaft carrying a pinion 110, fast on its end, just beyond said box 109. The timber 17 is recessed, as shown at 111, on said outer side and at the longitudinal center of the recess is slotted entirely through, as shown at 112. The said shaft 108 is shown formed with a longitudinal groove 113 for the reception of a feather 114 in the bore of a pinion 115, which thus slides loosely on said shaft, though, if preferred, the feather may be on the shaft and the groove in the bore of the pinion. Movable within the described recess and slot in the timber 17 is a guide-block 116, bored for the reception of a shaft 117, which carries at its outer end just beyond the said block a pinion 118, fast thereon, in mesh with the described loose pinion 115, which latter is kept in engagement with pinion 118 by a stop-arm 119, secured to and projecting from said block 116 and having a forked outer end which straddles shaft 108 and bears against the hub of said pinion 115.

Figures 10, 11:
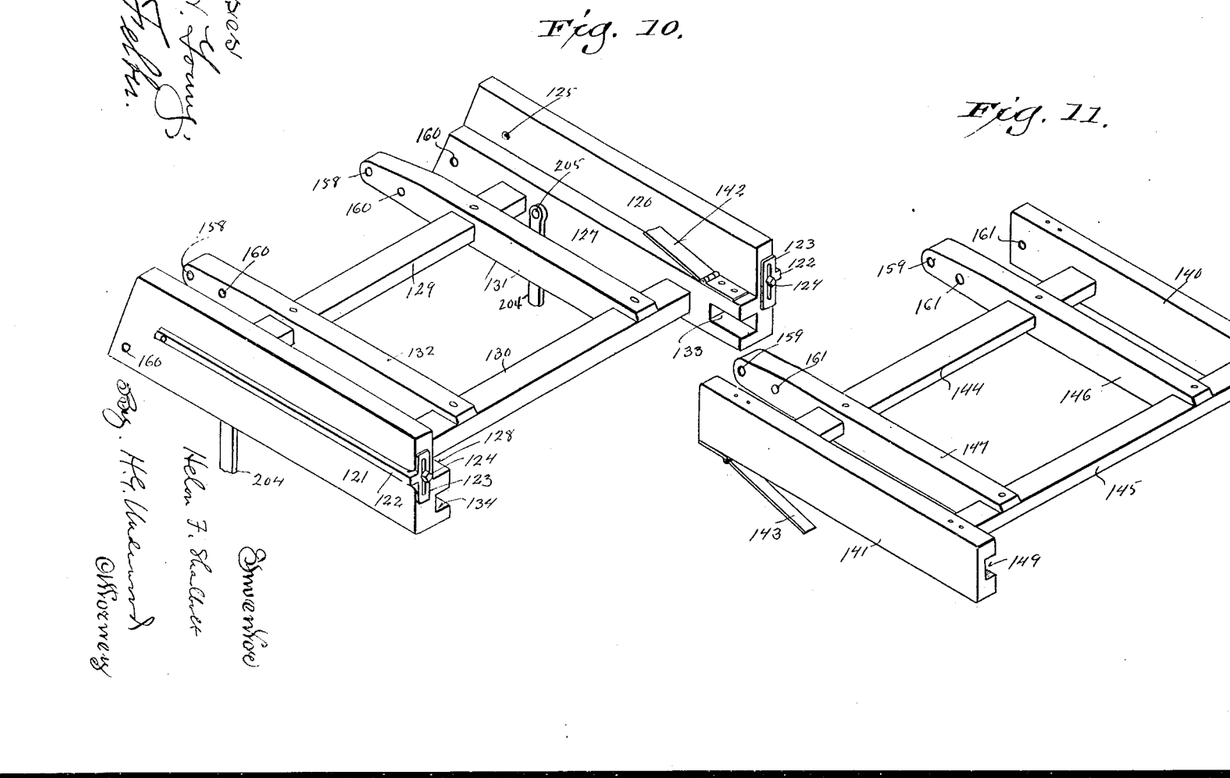

Beyond the cutting mechanism at the discharge end of the machine is a carrier-frame, which will next be described. This frame is in two parts, a lower part and an upper part. (Shown, respectively, in the perspective views, Figs. 10 and 11, and together in sectional elevation in Fig. 8.) The lower part has two side pieces 120 121, each with an outside feather 122, made of metal and integral with a vertical plate 123, which goes against one end of the side piece and is formed with a longitudinal slot therein, so that this plate may be varied in elevation (to vary the elevation of the feather at the end) and held in adjusted position by cap-bolt 124. The other end of the feather 122 is held by a screw-bolt 125, passed through the side piece from the inside and screwing into a bore tapped into the feather, the head of said screw-bolt being countersunk in the side piece to be flush with the inner surface thereof, all as best indicated in Fig. 10. These feathers 122 move in longitudinal grooves 126 in the inner sides of the timbers 16 17.

Figures 8, 16:
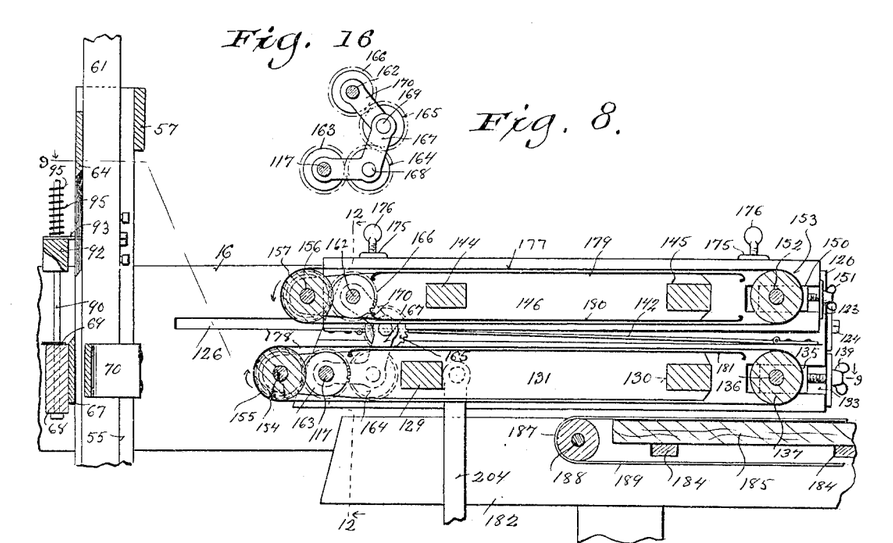
Fig. 8 is a detail vertical sectional view taken on the plane indicated by the line 8 8 in Fig. 9.
Fig. 16 is a detail view of certain of the gearing.
Figure 9:
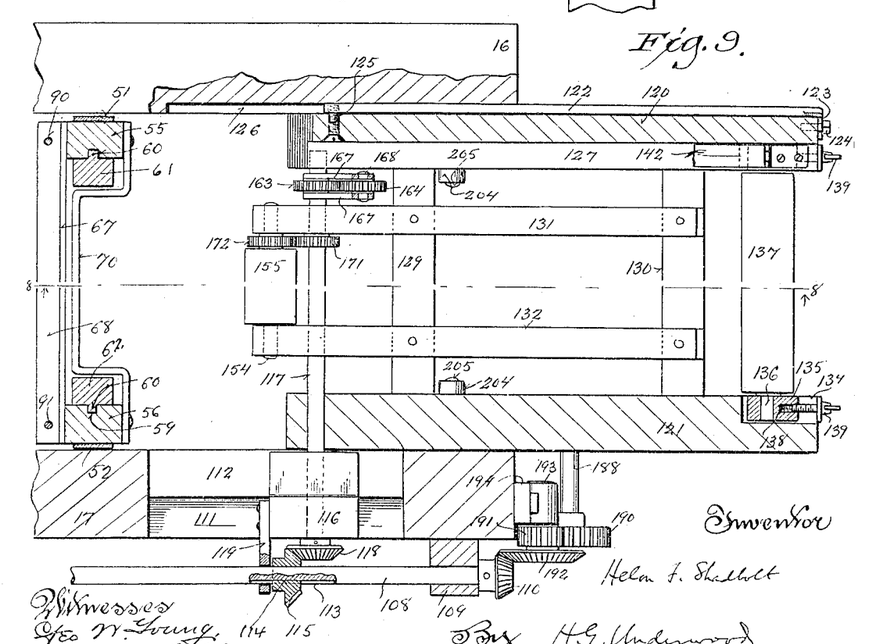
Fig. 9 is a detail broken plan view of portions of the mechanism just back of the cutting mechanism, partly in section, on the plane indicated by the line 9 9 in Fig. 8.

The side pieces 120 121 are of increased thickness in their lower portions, so as to form inner ledges 127 128, and are there united by cross-bars 129 130, whose ends are mortised into the said inner ledge portions. 131 132 designate two longitudinal bearing-beams, mortised to the cross-bars 129 130 and projecting beyond the frame toward the cutting mechanism, as shown in Figs. 8 and 9. At the opposite end of the frame the inner ledge portions 127 128 are recessed, as shown at 133 134, for the reception of bearing-blocks 135, which have transverse bores therethrough for the ends of the journal 136 of the transverse roller 137 and longitudinal-tapped bores 138 for the shanks of the adjusting thumb-screws 139. In some instances the shank of the screw is rigidly fastened to the block 135 and the adjustment made by turning a thumb-nut, the action and result being the same in either case. The upper part of said frame is best shown in Fig. 11, comprising two side pieces 140 141, which fit within the side pieces of the lower part and rest on the described inner ledge portions 127 128, to which the said side pieces 140 141 are united by the hinged distance-straps 142 143, which prevent lateral movement but permit vertical separation of the two parts of the frame. The side pieces 140 141 are united by cross-bars 144 145, mortised thereto, and there are two longitudinal bearing-beams 146 147 mortised to said cross-bars and projecting beyond said upper part of the frame toward the cutting mechanism like the bearing-beams 131 132 of the lower part of the frame, though extending a less distance. The side bars 140 141 at the opposite end of the frame are recessed, as shown at 148 149, for the reception of bearing-blocks 150 and adjusting-screws or screws and thumb-nuts 151, as in the lower part of the frame just described, these upper bearing-blocks being bored to receive the journal 152 of the upper transverse roller 153.

The bores 158 158 nearest the projecting ends of the lower bearing-beams 131 132 receive the journal 154 of the transverse roller 155, while the corresponding bores 159 159 in the projecting ends of the upper bearing-beams 146 147 receive the journal 156 of the upper transverse roller 157. The bores marked 160 in the side pieces and beams of the lower part of the frame in Fig. 10 are for the described shaft 117, the inner end of this shaft resting in this bearing in the part 127 of the side piece 120, but not extending entirely through the said side piece. The bores 161 through the beams 146 147 of the upper part of the frame and in but not through the side pieces 140 141 thereof are for the reception of transverse shaft 162.

In Fig. 16 I show a train of gears 163 164 165 166, linked together in the following manner: Gear 163 is fast on shaft 117 and is connected by the angular links 167 167, loose on said shaft on each side of said gear, to studs 168 and 169 on gears 164 165, while gear 166 is fast on shaft 162 and connected by short links 170, loose on said shaft 162 on each side of gear 166, to stud 169 of gear 165. Fast on shaft 117 on the other side of beam 131 from the train of gears just named is gear 171, which meshes with gear 172, fast on the journal 154 of the transverse roller 155. Shaft 162 has fast thereon a gear 173, corresponding to gear 171 below, which similarly engages with a gear 174 on the journal 156 of the upper transverse roller 157. By reason of the described train of gears the upper part of the carrier-frame can be lifted as much as desired above the lower part, and to keep them sufficiently separated and to lighten the pressure on the material running through between said parts of the frame, as hereinafter described, the side pieces 140 141 are provided with lateral ears 175, which project over the top edges of the side pieces 120 121 and which ears are tapped for the passage of thumb-screws 176 to bear on said parts 120 121 as adjusted. An endless carrier-belt 177 extends around the transverse rollers 153 157 of the upper part of the frame, and a like carrier-belt 178 around the transverse rollers 137 155 of the lower part of the frame, there being preferably sheet-metal shields, as 179 180 181, to guard against sagging of the said endless carriers which pass over or against said shields, any slack being taken up by the described adjusting screws and nuts 139 151.

Bolted to the timbers 16 17 are the side pieces 182 183 of the table-frame at the delivery end of the machine, these side pieces being united by series of cross-slats 184 184, on which there rests the table-top 185, flush with the said side pieces at its upper surface. The outer ends of the side pieces and table-top are not shown in the drawings, but they continue, as indicated, for several feet, where the side pieces have legs (not shown) resting on the floor to support the outer ends thereof, the inner ends being supported by the bolts 186 186, which enter the longitudinal timbers 16 17, as stated.

187 designates a roller carried by shaft 188, which is journaled in the side pieces 182 183, the said roller and shaft being duplicated adjacent to the outer end (not shown) of said side pieces, and 189 designates a canvas endless carrier running around said roller 187 and the corresponding roller (not shown) at the outer end of the side pieces, the said carrier traveling over the described table-top 185 and having preferably means for taking up the slack, similar to the means shown in Fig. 8 for taking up the slack of the endless carriers 177 178.

On the outer end of shaft 188 there is made fast a pinion 190, which meshes with the spur-pinion 191, which is formed on the hub of a compound gear, the other part of which is a bevel-pinion 192, in mesh with the bevel-pinion 110, fast on the end of the longitudinal shaft 108, hereinbefore described. This compound gear 191 192 runs loose on a stud 193, projecting rigidly from a support 194 on the adjacent end of timber 17.

Journaled in the hereinbefore-named longitudinal braces 9 10 is a transverse shaft 195, and to the end of this shaft which projects through and outside of brace 9 there is made fast a miter-gear 196, which meshes with a like gear 197, fast on the lower outer longitudinal rock-shaft 30. Fast to the said shaft 165, a little inside the said braces 9 and 10, are arms 198 199, and to the other ends of these arms there are pivotally attached the lower ends of links 200 201, whose upper ends are pivotally connected to the hereinbefore-named longitudinally-arranged bent levers 77 78. Rigidly secured to the center of said shaft 195 is an upright arm 202, to whose upper end is secured a rod 203, having branches 204 204, which extend at planes outside of the cutting mechanism and whose farther ends are bent upward and pivotally attached to the inner faces of the ledge portions 127 128 of the hereinbefore-described lower part of the carrier-frame, as shown at 205 205. For the sake of clearness I will specify the various pivot-bolts of the hereinbefore-named parts by numerals, as follows: The pivot which unites arms 75 and lever 77 is marked 206, and corresponding pivot for the parts 76 and 78 is marked 207. The pivot for the lever 77 and link 200 is marked 208, and the pivot for the corresponding parts 78 and 201 is marked 209. The pivot that connects arm 198 and link 200 is marked 210, and that which connects the corresponding parts 199 and 201 is marked 211, while the pivot which connects arm 202 and rod 203 is marked 212.

On the under side of timbers 16 17 are blocks 213 214, hinged thereto, as shown at 215 216. These blocks have holes bored transversely therethrough for the reception of a transverse shaft 217, which carries the lower feed-roller 100, which yields slightly when the mat of material 218 of excelsior wrapped in paper passes through from the mandrel 219 and former-tube 220 on its way to the described cutting mechanism to be reduced to wrappers and pads, just as in my prior patent hereinbefore referred to. The present machine, so far as the excelsior-feeding devices, the paper-rolls, and paper-folding devices, and the gluing devices and the accessories and adjuncts thereto, is substantially as shown and described in my said prior patent, and hence I have not deemed it necessary to reproduce the drawings and description of said parts on the farther side or beyond the said former-tube or mandrel, where the combined paper and excelsior mat 218 is made in a continuous length, which, as in said prior patent, passes between the feed-rollers 99 and 100 and then travels over a guide-board 221 (supported on cleats 222, secured to the said longitudinal timbers 16 and 17 and extending between the same) and the curved guide 69 and over the stationary knife 67 to be cut into proper lengths by the descending obliquely-arranged knife 64. The described slight yield of the lower feed-roller 100 is permitted by reason of rubber blocks 223 224 between the under side of the hinged blocks 213 214 and the heads of screws 225 226, said screws passing through enlarged holes in said hinged blocks to allow a slight play, all as in said prior patent hereinbefore referred to. The lower feed-roller shaft 217 carries at one end adjacent to timber 17 a gear-wheel 227 in mesh with the described gear-wheel 103 above, these gear-wheels having long teeth to prevent separation when the lower feed-roller 100 is depressed by the passage of the mat of material 218 therethrough, as hereinbefore described.

The described transverse shaft 40, which supports the crank-disk 44, carries at about its center a sprocket-wheel 228. The side pieces 182 183 of the table-frame have hangers 229 230 depending therefrom, in which are journaled transverse shafts 231 232, on which shafts, inside the hanger 230, are made fast, respectively, the gear 233 and pinion 234, the shaft 232 further carrying fast thereon a sprocket-wheel 235 inside of and adjacent to the hanger 229. This sprocket-wheel 235 is connected to the described sprocket-wheel 228 by sprocket-chain 236. The shaft 231 projects through the hanger 229 and carries at its outer end a cam-disk 237.

Figure 1:
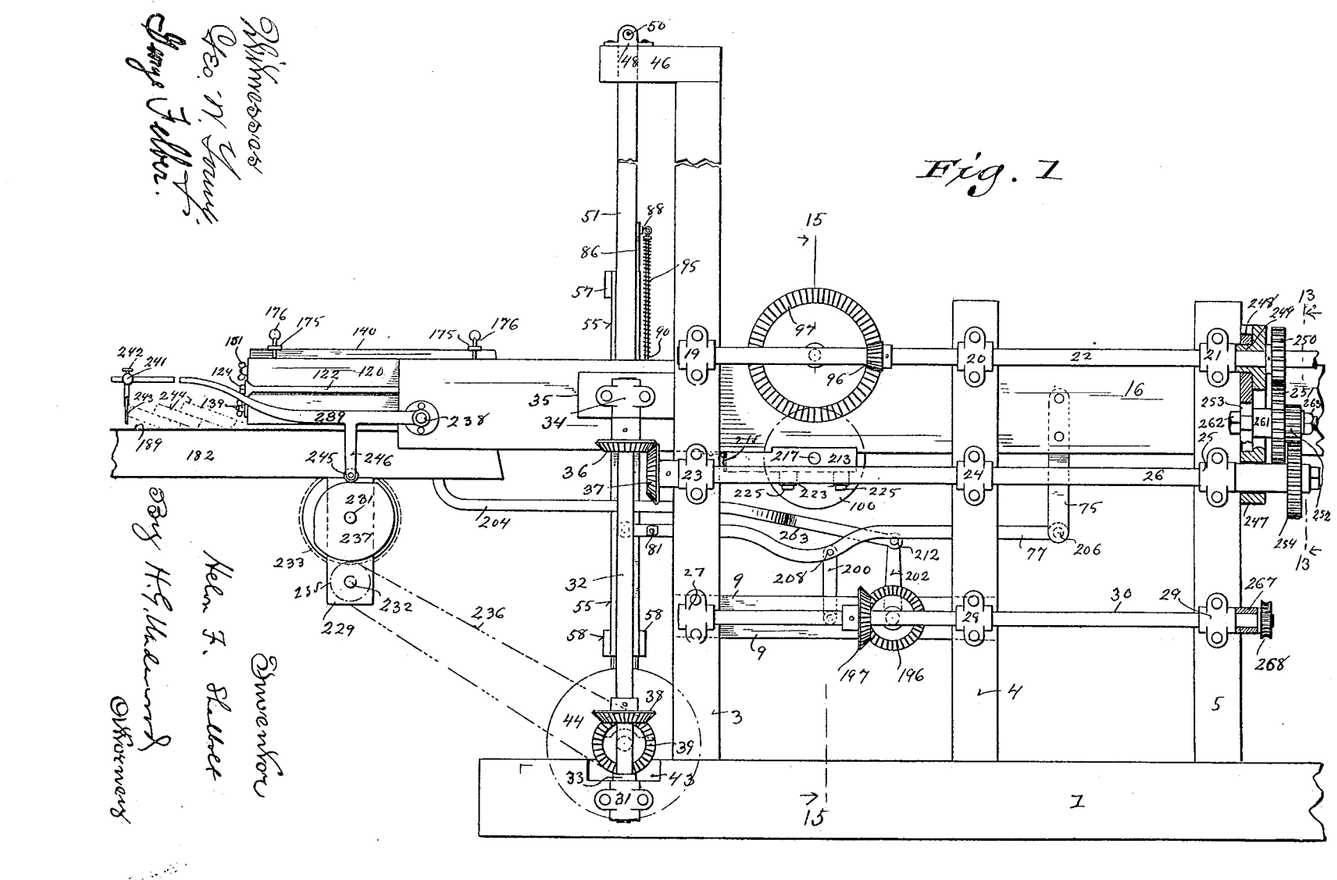
Figure 1 is a view in side elevation of the mechanism at one side of the machine adjacent to said discharge end, partly broken away or in section to better illustrate certain details of construction.

238 designates a stud or pin secured to and projecting from the timber 16, and 239 is a bent arm, one end of which is journaled on said stud or pin, said arm projecting longitudinally over the side piece 182 and carrying at its free end a transverse rod 240, projecting over the carrier 189, said rod terminating in a head 241, sliding on the end of arm 239, and when adjusted to the described point thereon held thereto by set-screw 242. Secured to or suspended from said rod 240 is a gate 243, consisting of a strip of sheet metal to serve as a detent for the wrappers or pads carried by the carrier 189 as they encounter said gate in the travel of the said carrier, which latter then passes on beneath the gate, leaving the said articles bunched together, as shown in dotted lines at 244 on Fig. 1. By a proper relative adjustment of the speed of revolution of the described gear 233 and the sprocket-wheel 228 on the shaft 40 the revolution of the cam-disk 237 (which is on the same shaft 231 as the said gear 233) can be timed to a certainty, so that when the roller 245 on the lower end of the downward projection 246 on said arm 239 encounters the cam edge of said disk 237 the gate 243 will drop down by gravity and stay down till said roller 245 meets the circumferential edge of said disk. While the gate is thus down a predetermined number of pads or wrappers is cut off from the mat 218 and is being forwarded by the carrier 189 as far as the said gate will permit, so as to bunch them together for convenience in counting and handling, and then, as the gate rises, the carrier carries this bunch forward until the cam edge of the disk 237 again meets the roller 245 and permits the gate to fall and a fresh bunch is accumulated, and so on. The number of pads or wrappers that are thus collected in bunches, as stated, is determined by the relative number of revolutions of the gear 233 and sprocket 228. For example, if there are four revolutions of the latter to each revolution of the former then four of the said pads or wrappers will be stopped and bunched by the said gate 243, as shown in Fig. 1, with each revolution of the gear 233 and cam-disk 237.

247 represents a supporting-frame secured by bolts, as shown, to the upright 5 and to the timber 16.

248 is the adjusting-lever, which is fulcrumed on an upper hub 249 of the frame 247, through which hub the main drive-shaft 22 passes.

250 designates a permanent pinion fast on said drive-shaft 22. This pinion 250 is in mesh with a gear 251, which, with its integral pinion 252, may be removed and another gear and pinion substituted, or the said gear and pinion may be reversed, so that the pinion 252 may be in mesh with the said permanent pinion 250, this being made possible by slot 253 in the lever 248. As shown, the pinion 252 is in mesh with a gear 254 on the adjacent end of shaft 26; but, if desired, this gear 254 may be removed and one of different diameter substituted, all of these suggested changes being to permit pads or wrappers of different lengths to be manufactured, as in my prior patent hereinbefore named, the said adjusting-lever 248 being moved as required by loosening bolt 255 and moving same in the arc-slot 256 in the frame 247 and then after the gears have been adjusted tightening the parts together by nut 257 on said bolt 255, substantially as in my said hereinbefore-named prior patent, and at the same time loosening bolt 258 in an upper arc-slot 259 of said lever 248 and after adjustment tightening the parts by means of a nut 260. The compound gear 251 252 is loosely mounted on the end of a stud 261, having reduced screw-threaded ends, one of which extends through the slot 253 to take the nut 262, while the other end takes the nut 263.

Mounted on the bolt 255 and held by nut 257 is a connecting-rod 264, whose lower end is connected by pivot-bolt 265 to a lever 266, to whose lower end said pivot-bolt is rigidly secured, the other end of this lever being formed into a hub 267, loose on rock-shaft 30, between box 29 and a worm-gear 268, fast on the end of said shaft 30. The lever 266 is provided with ears 269 270, close to its hub 267, for the reception of a worm 271, which is stepped in ear 269, the ear 270 being originally loose and fastened to the lever 266 after the worm is in place, and the hand-wheel 272 is fastened to the upper end of the shank of said worm 271.

The operation of my machine will be readily understood from the foregoing description of its construction taken in connection with the accompanying drawings. When the continuous mat 218 passes through between the feed-rollers 99 and 100 and over the guide-board 221, it encounters the curved guide 69 and is thereby directed over the stationary knife 67. As the main drive-shaft 22 revolves the pinion 96, fast thereon, turns the gear 97, fast on the shaft 98 of the upper feed-roller 99, and the gear 103 on the other end of shaft 98 turns the lower feed-roller 100, so as to feed the mat 218 forward, as just described. The gear 103 at the same time engages with and turns pinion 104 on the upper arm of bracket 105, and said pinion 104 engages with the spur-teeth of compound pinion 106 immediately below on the lower arm of said bracket, said compound pinion having also miter-teeth on its side which engage with and turn the miter-gear 107 on the end of longitudinally-arranged shaft 108. The groove 113 in shaft 108 receives the feather 114 in the bore of loose pinion 115, sliding on said shaft 108, and is held to engagement by stop-arm 119 with pinion 118 on the end of transverse shaft 117. This last-named shaft is fast to gear 163 of the described train of gears 163 164 165 166 in the hereinbefore-named carrier-frame, and as shaft 117 is thus revolved by said loose pinion 115 on shaft 108 the described train of gears and connecting-gears on the shafts of the gears in said train will cause all of the said gears to rotate, and this will move the transverse rollers 155 and 157 in opposite directions. These rollers are connected by endless canvas carrier-belts 178 and 177 to idler-rollers 137 and 153, so that the wrappers and pads from the cutting mechanism will be received between the described carrier-belts and carried forward and drop down onto the carrier-belt 189 below, and as the belt 189 moves at a lower rate of speed than the belts above in the carrier-frame these wrappers or pads as they fall lap over one another and are thus carried forward on and by belt 189 till stopped by gate 243, as shown in Fig. 1 and already described, and still further bunched together, for counting and removal, as the said gate lifts, and the bunched wrappers or pads are carried still farther on the delivery-table by the belt 189.

Figure 2:
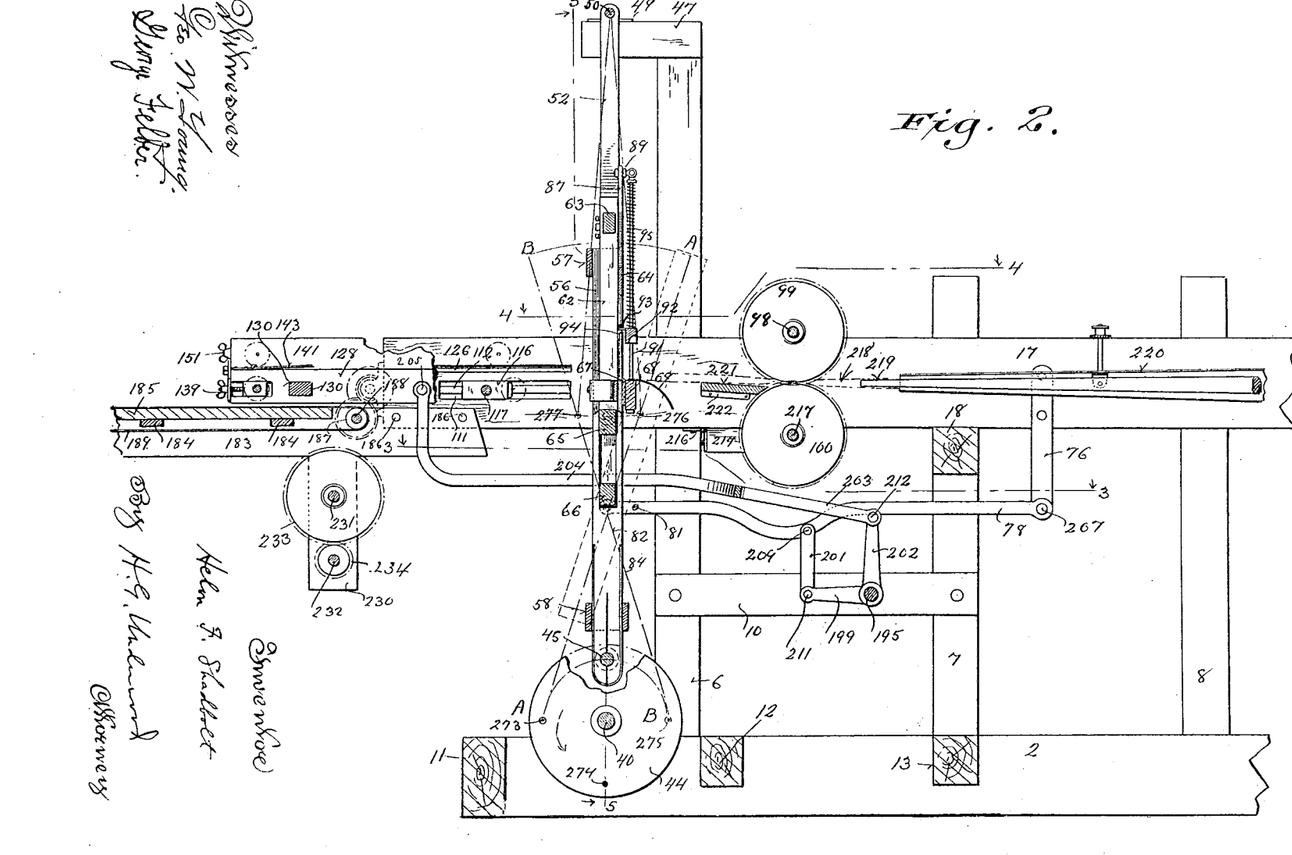
Fig. 2 is a vertical longitudinal sectional view taken on the planes indicated by the line 2 2 in Fig. 4.

In Fig. 2 I show the cutting mechanism in full lines and indicate the oscillating swing thereof by dotted lines. The connecting-rod 82 and the sash-frame and sash are all shown at rest in a vertical position, with the crank-pin 45 and obliquely-set knife 64 at their highest points. Now as the drive-shaft 22 revolves, the permanent pinion 250 thereon and the connected chain of gears rotate the pinion 254 on the end of shaft 26 and this revolves the miter-gear 37 on the other end of said shaft, and through miter-gear 36 vertical shaft 32 and miter-gears 38 and 39 the transverse shaft 40 and crank-disk 44 are thereby rotated, so that as said crank-disk 44 begins to turn in the direction of the arrow shown in Fig. 2 the lower end of connecting-rod 82 is carried down and outward by crank-pin 45 to the point 273 on the disk, when the connecting-rod, sash-frame, and sash will stand, as shown by the oblique dotted line A A, with the presser-bar 92 and knife-blade 64 just above the mat 218, which rests on the stationary knife-blade 67. Just as the knife begins to cut the mat the crank-pin 45 would be in the position shown by the dot 273 on the crank-disk 44 in Fig. 2, the said crank-disk continuing to revolve in the direction of the arrow shown thereon and the knife 64 continuing to descend till the crank-pin 45 has moved to the position indicated by the dot 274, at which time the said knife has finished its cut and descent and commences to rise by reason of the connecting-rod 82 now carrying upward the sash on which said knife is supported, and the upper end of the sash-frame is swinging outwardly all this time until the crank-pin 45 has reached the point indicated by the dot 275, completing a half-revolution of the crank-disk 44 from the point indicated by dot 273, and then the connecting-rod, sash-frame, and sash are in the opposite oblique position, as indicated by the dotted lines B B in Fig. 2, to that described when the knife 64 begins to cut the mat 218. As the crank-disk 44 continues to revolve the knife 64 and presser-bar 92 rise and the mat 218 again passes over the lower knife 67, and as the crank-pin 45 reaches its original position (shown in full lines in Fig. 2) the upper knife 64 begins to descend and the just-described cutting operation is repeated once for every complete revolution of the crank-disk 44.

The dots 276 277 in Fig. 2 indicate the centers of the swing of the cutting mechanism on each side of the normal vertical position of the same, (shown in full lines,) and thus indicate that when there is a swing to the left (in the position of the parts shown in Fig. 2) the just-severed sections of the mat 218 are carried over close to the described carrier-frame, so as to be received and pass between the upper and lower carrying-belts thereof, as already described.

As has been already stated, when it is desired to vary the length of the sections of the mat 218 which form the wrappers or pads alteration is made in the chain of gears connecting the permanent pinion 250 on the drive-shaft 22 with the pinion on the adjacent end of shaft 26, and when this is done an adjustment of the carrier-frame (nearer to the cutting mechanism or farther therefrom, according as shorter or longer sections are to be cut from the mat 218) and the fulcrum-point of the sash-frame must be changed, up for a shorter section and down for a longer section. If a shorter section is desired, the gear 254 on shaft 26 is replaced by one of less diameter and the adjusting-lever 248 brought down toward the lower end of slot 256 to put the chain of gears in mesh. This moves the connecting-rod 264 and lever 266, attached to rock-shaft 30, and partly rocks said shaft, turning the miter-gear 197 on said shaft, and thereby the miter-gear 196 on end of transverse shaft 195. This will draw on and raise the arms 198 and 199, and thereby raise links 200 201 and with them the levers 77 and 78, and thus elevate the fulcrum-points of the sash-frame, which will lessen the distance between said fulcrum-points and the stationary knife 67 and increase the distance between said fulcrum-points and the crank-pin 45. This will lessen the swing of the sash-frame and connected parts; but to compensate for this this same rocking of the shaft 30 will draw the upright arm 202 to the right (in the position of parts shown in Figs. 1 and 3) and through the rod 203 and its branches 204 204 will move the carrier-frame nearer to the cutting mechanism. If a longer section is desired, the described gear 254 is replaced with one of greater diameter, which requires that the adjusting-lever be raised in the arc-slot 256 and the connecting-rod 264, lever 266, and rock-shaft 30 to be moved in the opposite direction from that just described, and the various gears, shafts, arms, links, levers, and rods just named will all be moved in the reverse direction, which will lower the fulcrum-points of the sash-frame and increase the distance between same and the carrier-frame and increase the distance between the stationary knife and the fulcrum-points of said sash-frame and lessen the distance between said fulcrum-points and the crank-pin 45.

Figures 12, 14:
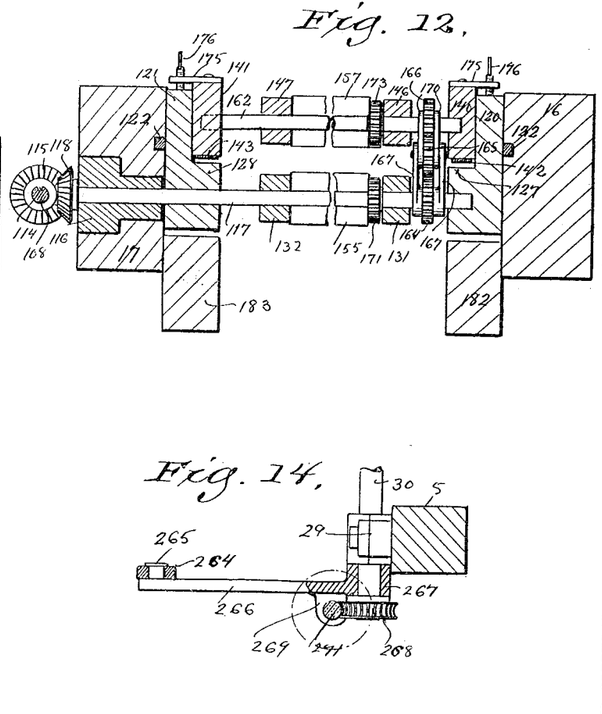
Fig. 12 is a detail transverse sectional view taken on the plane indicated by the line 12 12 in Fig. 8.
Fig. 14 is a detail sectional view taken on the plane indicated by the line 14 14 in Fig. 13.
Figure 13:
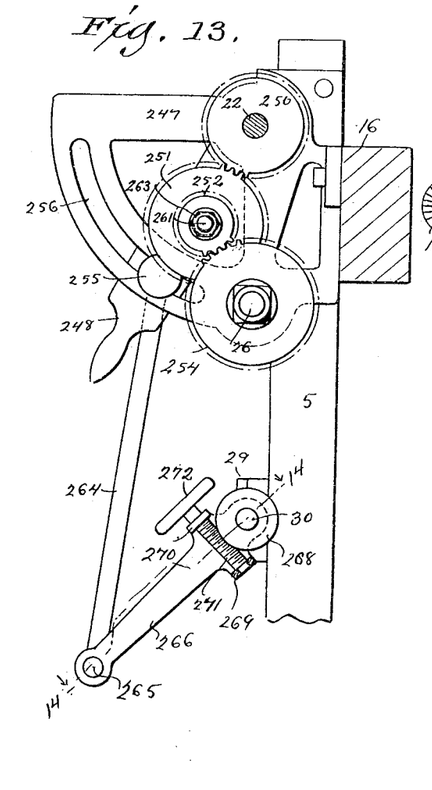
Fig. 13 is a detail elevation of the mechanism for varying the length of the cut-off sections, partly in section, on the plane indicated by the line 13 13 in Fig. 1.
Figure 15:
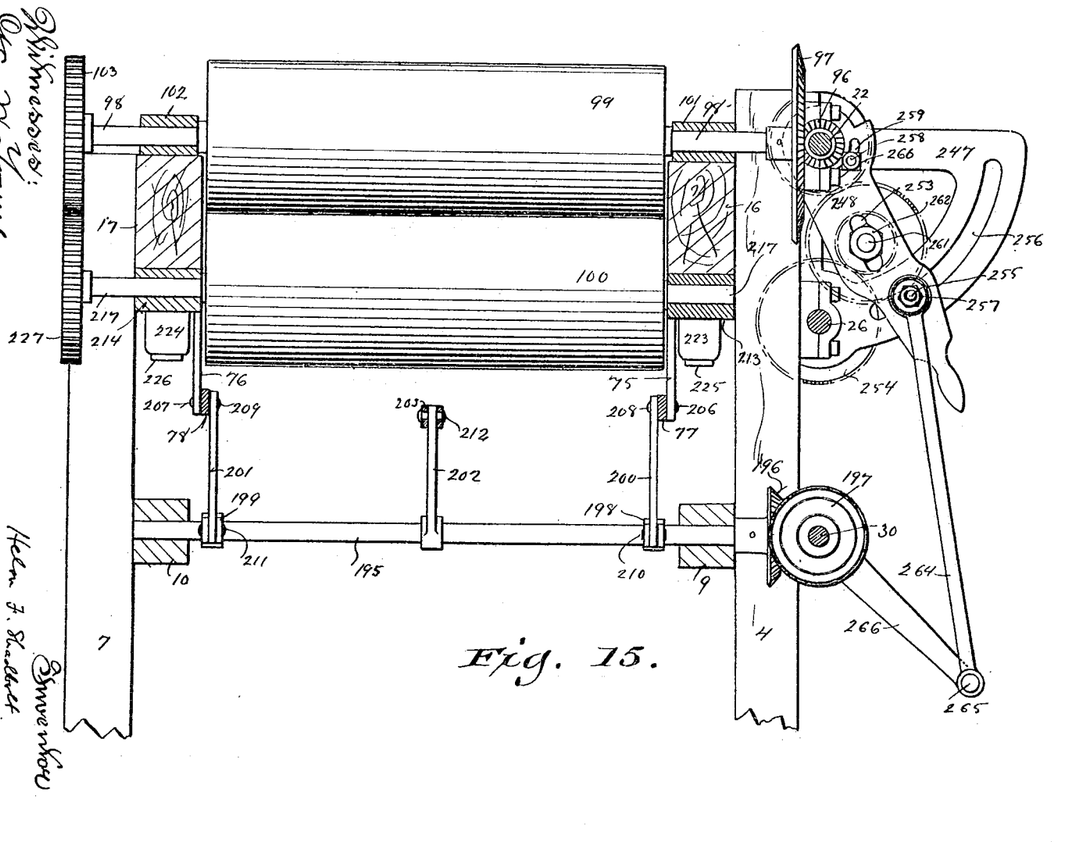
Fig. 15 is a transverse vertical sectional view taken on the plane indicated by the line 15 15 in Fig. 1.

It will sometimes happen that with material of different thicknesses going through the feed-rollers 99 100 there will be a slight variation in the time of passage of the mass of material between said rollers, and hence a slight additional adjustment is sometimes necessary on this account, to accomplish which is the function of the worm mechanism. (Shown best in Figs. 13 and 14.) If it is desired to lengthen the travel of the knife, the hand-wheel 272 is turned in one direction, and to shorten such travel turned in the opposite direction, as required, this slight adjustment being capable of being carried out without any alteration of the described gear and even without stopping the operation of the machine.

Having thus described my invention, what

I claim as new, and desire to secure by Letters Patent, is—

1. In a machine for the manufacture of excelsior wrappers and pads, the combination with a suitable frame, of a continuously-moving feed mechanism for carrying a continuous mat of material to be severed into lengths; an oscillating cutting-frame for the reception of said material; mechanism for continuously reciprocating the cutting devices therein; a delivery-table, and an endless carrier movable over the same; an adjustable carrier-frame having upper and lower endless carriers above the plane of said delivery-table for receiving the severed lengths between them; and mechanism for continuously moving said carriers on the carrier-frame in opposite directions, and carrying forward the said severed lengths, and depositing them upon the carrier of the delivery-table below.

2. In a machine for the manufacture of excelsior wrappers and pads, the combination with a suitable frame, of a continuously-moving feed mechanism for carrying a continuous mat of material to be severed into lengths; an oscillating cutting-frame for the reception of said material; mechanism for continuously reciprocating the cutting devices therein; a delivery-table and an endless carrier movable over the same; an adjustable carrier-frame having endless carriers for receiving the severed lengths from the cutting-frame and transporting them to the delivery-table carrier; a cam-controlled arm pivotally secured to said frame; and a gate adjustably secured to said arm, and extending transversely over the delivery-table carrier, to detain and bunch together the said severed lengths until a predetermined number is thus collected.

3. In a machine for the manufacture of excelsior wrappers and pads, the combination with a suitable frame, of a continuously-moving feed mechanism for carrying a continuous mat of material to be severed into lengths; an oscillating cutting-frame for the reception of said material; a continuously-revolving transverse shaft, carrying a disk fast on the inner end thereof; a crank-pin on said disk; a stationary knife secured to said cutting-frame, a vertically-movable sash in said cutting-frame carrying an obliquely-arranged knife; a connecting-rod extending from said sash to said crank-pin; a sprocket-wheel carried by said transverse shaft; a delivery-table secured to said frame, and an endless carrier movable over said delivery-table; an adjustable carrier-frame having endless carriers for receiving the severed lengths from the cutting-frame and transporting them to the delivery-table carrier; hangers depending from each side of the table-frame; a pair of transverse shafts journaled one above the other in the said hangers; a gear fast on the upper shaft, and a pinion in mesh therewith fast on the lower shaft; a sprocket-wheel fast on said lower shaft, and a sprocket-chain connecting this sprocket-wheel with the sprocket-wheel on the first-named transverse shaft which carries the crank-pin disk; a cam-disk secured to the outer end of the upper transverse shaft, outside of the adjacent hanger; a forward-projecting arm pivotally secured to the frame; a downward projection on said arm, carrying a roller at its lower end in engagement with the periphery of the said cam-disk; and a gate adjustably secured to said arm, and extending transversely over the delivery-table carrier, the gears of the machine being so proportioned and timed that one length of the continuous mat of material is severed with each revolution of the sprocket-wheel on the first-named transverse shaft, and the gear on the upper transverse shaft between the hangers making a predetermined number of revolutions with each revolution of the said sprocket-wheel.

4. In a machine for the manufacture of excelsior wrappers and pads, the combination with the main frame and longitudinal side timbers secured thereto and formed with longitudinal grooves in the inner sides thereof, of a longitudinally-adjustable carrier-frame having vertically-adjustable longitudinal feathers on its outer sides for engagement with the said longitudinal grooves in the said timbers, the said carrier-frame being made in two parts, with its outer side pieces of increased thickness in their lower portions forming inner ledges, and the side pieces of its inner portion resting on said ledges, and secured thereto by hinged distance-straps, which prevent lateral movement, but permit vertical separation of the two parts of the frame; transverse rollers at the ends of each part of said frame; carrier-belts extended over said rollers forming upper and lower endless carriers, and gearing for moving said carriers simultaneously in opposite directions.

5. In a machine for the manufacture of excelsior wrappers and pads, the combination with the main frame and longitudinal side timbers secured thereto one of said timbers being formed with a longitudinal recess and central slot, a carrier-frame adjustably secured to said timbers and having upper and lower endless carriers, and cutting mechanism adjacent to said carrier-frame, of a transverse upper feed-roller, and a lower feed-roller geared to said upper feed-roller, and between which rollers the material to be severed into lengths is fed; a power-shaft geared to the shaft of the upper feed-roller; a gear fast on the opposite end of said shaft; a longitudinal shaft connected by a train of gears to said last-named gear, and formed with a longitudinal groove; a pinion loose on said shaft, and having a feather in its hub in engagement with the groove in the said shaft; transverse rollers in the carrier-frame over which its endless carriers travel; gears on the shafts of the forward transverse rollers of the carrier-frame; upper and lower transverse shafts adjacent to said forward transverse roller-shafts; a chain of gears connected to said upper and lower shafts, and in engagement with the gears on said forward transverse roller-shafts; a guide-block movable in the longitudinal recess of one of said longitudinal timbers and supporting the adjacent end of the lower transverse shaft whose other end is fast to one of said chain of gears; a pinion fast on the adjacent end of said shaft, just outside of said guide-block and in engagement with the loose pinion on the longitudinal-grooved shaft; and a stop-arm on said guide-block for keeping the said pinions in engagement, whereby as the described gears are rotated from the power-shaft, the upper and lower endless carriers on the carrier-frame will be moved in opposite directions, and receive between them and carry forward the severed lengths of material from the cutting mechanism.

6. In a machine for the manufacture of excelsior wrappers and pads, the combination with the main frame and longitudinal side timbers secured thereto, having longitudinal grooves on their inner sides, of an adjustable carrier-frame having longitudinal feathers on its outer side pieces for engagement within the said grooves of the longitudinal timbers; a transverse shaft having a central upright arm; a forward-extending rod pivotally secured to said upright arm, and having branches secured to said carrier-frame; a miter-gear fast on one outer end of said transverse shaft; a longitudinal rock-shaft journaled at the adjacent outer side of the main frame and having fast thereon a miter-gear in mesh with that on the adjacent end of the said transverse shaft; a supporting-frame having adjustable gearing and an adjusting-lever carried thereby; a lever whose upper end is connected to said rock-shaft and a connecting-rod, one end of which is pivotally connected to the lower end of said lever, and the other end of which rod is connected to said adjusting-lever.

7. In a machine for the manufacture of excelsior wrappers and pads, the combination with the main frame, of an oscillating frame carrying the cutting devices, and having longitudinal grooves in the outer sides of its upright side pieces; sliding blocks in said grooves; arms depending from the upper timbers of the main frame; longitudinally-arranged bent levers, whose rear ends are pivotally secured to said arms, and whose forward ends terminate in inwardly-projecting lateral pins fulcrumed in recesses in said sliding blocks; a transverse shaft having fast thereon arms, to whose free ends there are pivotally attached links, whose other ends are pivotally attached to said longitudinally-arranged bent levers; a miter-gear fast on one outer end of said transverse shaft; a longitudinal rock-shaft journaled at the adjacent outer side of the main frame, and having fast thereon a miter-gear in mesh with that on the said transverse shaft; a supporting-frame, having adjustable gearing and an adjusting-lever carried thereby; a lever whose upper end is connected to said rock-shaft, and a connecting-rod, whose lower end is connected to the lower end of said lever, and the upper end of which rod is connected to said adjusting-lever.

8. In a machine for the manufacture of excelsior wrappers and pads, the combination with the main frame of a supporting-frame having adjustable gearing and an adjusting-lever carried thereby; an oscillating frame carrying the cutting devices; sliding blocks on said frame; pivotally-supported longitudinally-arranged levers terminating in lateral pins held in recesses in said sliding blocks to form the fulcrum-points of said oscillating frame; a transverse shaft linked to said longitudinally-arranged levers; a longitudinal rock-shaft geared to said transverse shaft; a worm-gear fast on one end of said rock-shaft; a lever having at one end a hub mounted on said rock-shaft; a worm carried by said lever, and in engagement with said worm-gear; and a connecting-rod one end of which is connected to the other end of said lever, and the other end of which rod is connected to said adjusting-lever.

In testimony that I claim the foregoing I have hereunto set my hand, at Sheboygan, in the county of Sheboygan and State of Wisconsin, in the presence of two witnesses.

HELON F. SHADBOLT.

Witnesses:
A. C. PRESCOTT,
FELIX BENFEY.